July 15, 1969        J. E. BILBRO        3,456,096
ELECTRICAL RESISTANCE HEATING APPARATUS
Filed Oct. 24, 1966
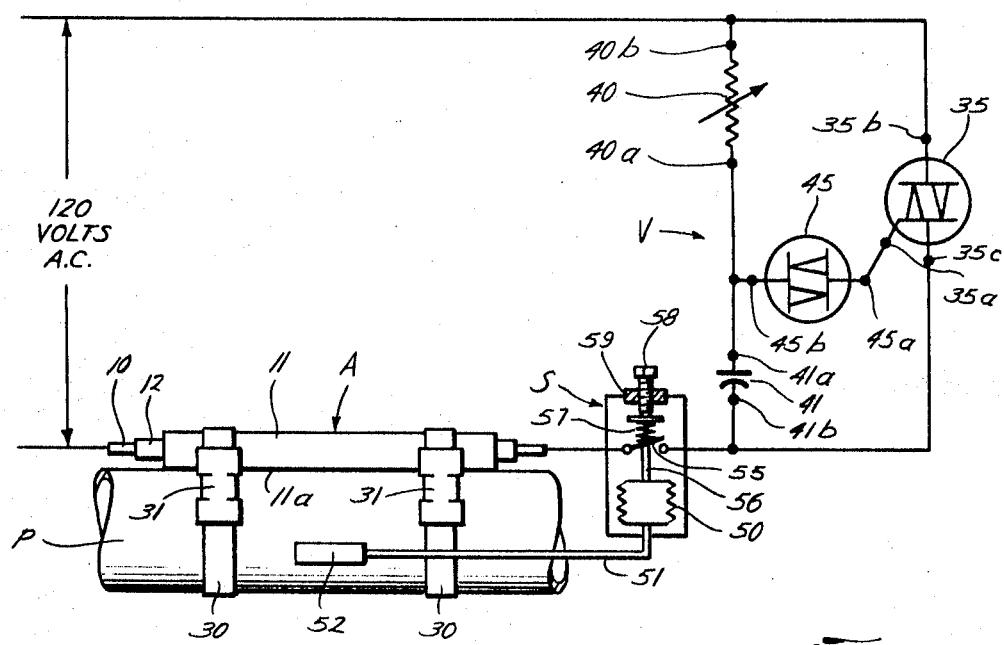
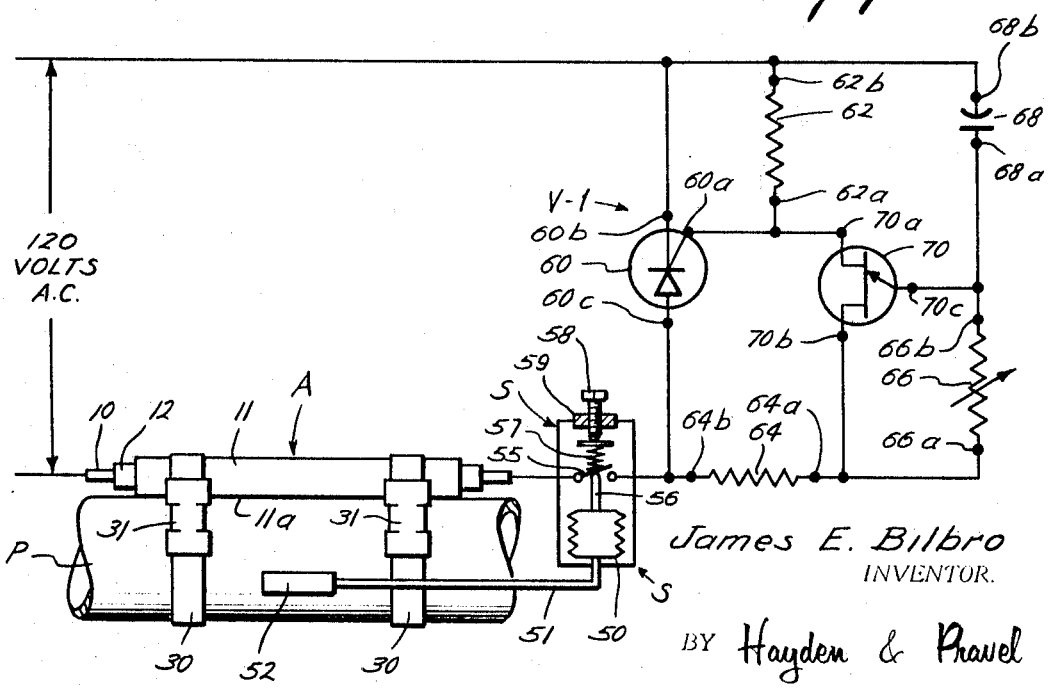
James E. Bilbro
INVENTOR.
BY Hayden & Pravel
ATTORNEYS

United States Patent Office 3,456,096
Patented July 15, 1969

3,456,096
ELECTRICAL RESISTANCE HEATING APPARATUS
James E. Bilbro, Houston, Tex., assignor to Thermon
Mfg. Co., a corporation of Texas
Filed Oct. 24, 1966, Ser. No. 588,840
Int. Cl. H05b 1/02
U.S. Cl. 219—501                                   5 Claims

ABSTRACT OF THE DISCLOSURE

A heat transfer apparatus is provided which includes an electrical heating wire connected in a circuit with a variable voltage control and also a temperature-responsive switch. The temperature-responsive switch is adapted to actuate the variable voltage control at a predetermined voltage setting in response to a desired temperature of an object being heated by the heating wire.

---

This invention relates to new and useful improvements in electrical resistance heating apparatus.

In prior co-pending United States patent application, Ser. No. 402,543, filed Oct. 8, 1964, heat transfer apparatus is disclosed which preferably has electrical resistance heating wires therewith for disposition on a pipe, valve, vessel, instrument or other object to be heated. Briefly, the present invention provides in combination with such heat transfer apparatus, a silicon controlled rectifier (SCR) variable voltage control or equivalent solid state device, and a temperature-responsive switch which is adapted to actuate the variable voltage control at a predetermined voltage setting in response to a desired temperature of the object being heated by the heat transfer apparatus. Significantly, the temperature-responsive switch is externally disposed with respect to the SCR variable voltage control so that relatively simple electrical circuits for the control may be used. Additionally, the present invention may be made up in advance as standard shelf items which may be installed and adjusted to desired operating conditions in the field by an unskilled workman for any particular physical dimensions and materials with which the apparatus is to be used.

It is therefore an object of the invention to provide a new and improved electrical resistance heating apparatus which is reliable, inexpensive, and easily installed by an unskilled man in the field for particular operating conditions.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view of the electrical resistance heating apparatus of the present invention, with the electrical components schematically illustrated; and FIG. 2 is a view similar to FIG. 1, but showing a modified leectrical circuit with the apparatus.

In the drawings, the letter A designates generally the heat transfer apparatus which is adapted to be mounted on a pipe P or other object having fluid or the like therein for heating same. The heat transfer apparatus A includes an electrical resistance heating wire or wires 10 which are connected in an electrical circuit with a variable voltage control designated generally by the letter V and also a temperature-responsive switch S. As will be explained more in detail, the present apparatus provides a controlled electrical resistance heating means which is reliable, inexpensive and easily installed by an unskilled man in the field for particular operating conditions with respect to the fluid or other object to be heated by the heat transfer apparatus A.

In the preferred embodiment, the heat transfer apparatus A has the construction described in said United States patent application Ser. No. 402,543. Thus, the heat transfer apparatus A preferably includes a channel member 11 which is formed of steel, rigid plastic or other relatively rigid material. Such channel member 11 may take numerous shapes, but as illustrated in the drawings, it is substantially semicylindrical so that its longitudinal lower edges 11a engage the external surface of the pipe P or other object to be heated. The electrical resistance heating wire or wires 10 are disposed within the channel 11 as illustrated in the drawings. Such wires 10 may be a conventional copper wire having a wire braid or insulation covering 12 therewith, a part of which is illustrated in the drawings by way of example. Also, it is preferred to provide a heat transfer material in the form of a putty or plastic which surrounds the electrical resistance wire or wires 10 within the interior of the channel member 11 so as to improve the heat transfer from the electrical resistance heating wire or wires 10 to the pipe P or other object to be heated.

The heat transfer apparatus A is preferably prefabricated with the wires 10 and the heat transfer material embedded within the channel member 11 so that such assembly may be kept on shelf or maintained as a standard item for marketing purposes. The channel member 11 with the wire or wires 10 and the heat transfer material may thus be assembled on the pipe P in the field by using clamping bands or straps 30 of conventional construction which are locked in place by a crimped locking clip or element 31, also of conventional construction. Any other suitable means for securing the channel member 11 and the electrical resistance heating wire 10 therewith in position on the pipe P may be utilized.

The electrical resistance heating wire or wires 10 are connected in an electrical circuit with a source of alternating current voltage indicated in the drawings as "120 volts A.C."

As previously pointed out, the electrical circuit includes a variable voltage control V which may take numerous conventional forms, but the form illustrated in FIG. 1 is preferred since it is simplified as compared to other conventional circuits and it employs reliable silicon controlled rectifier elements known as "SCR" elements in specific forms which are especially suitable for the particular combination of the present apparatus. Thus, the variable voltage control V includes a static, alternating current, semiconductor switch device which, in the preferred form of the invention, is an SCR assembly marketed under the designation "SC41B triac," manufactured by General Electric Company. Such semiconductor switch 35 has a gate terminal 35a, a first switch terminal 35b and a second switch terminal 35c. The triggering of the semiconductor switch 35 is accomplished by the circuitry which includes a variable resistor 40, a timing capacitor 41, and a bidirectional semiconductor trigger diode 45. The trigger diode is preferably of the type designated "ST-2 diac" by the manufacturer, General Electric Company. The trigger diode 45 has a first diode terminal 45a which is connected to the gate terminal 35a of the semiconductor switch 35.

The trigger diode 45 has a second diode terminal 45b which is connected to the first resistor terminal 40a of the resistor 40. The second resistor terminal 40b of the resistor 40 is connected to the first switch terminal 35b of the semiconductor switch 35 and also to the voltage source.

The charging capacitor 41 has a first capacitor terminal 41a which is connected to the second diode terminal 45b. The capacitor 41 has a second capacitor terminal 41b which is connected to the second switch terminal 35c of the semiconductor switch 35 and is also connected to the thermal or temperature-responsive switch S.

The switch S is schematically illustrated in the drawings since it may be of conventional construction. The basic elements of such switch S preferably include a bellows 50 which has a temperature expansive fluid internally thereof and which is connected by a capillary tube 51 to a sensing bulb 52. The temperature expansive fluid is also in the sensing bulb 52 and the capillary tube 51 so that as the temperature of the material such as steam or liquid within the pipe P is heated, the increase in temperature causes the temperature expansive fluid within the sensing bulb 52 to expand and thereby the bellows 50 is expanded.

The bellows 50 may be connected to the switch contact 55 in the circuit by any mechanical linkage such as a mechanical connector rod 56 which is directly attached to the bellows 50 as illustrated in FIG. 1. When the temperature of the material within the pipe P drops to a predetermined point, the fluid within the sensing element 52 contracts to cause the bellows to collapse, whereby the rod 56 moves downwardly so that the switch 55 is moved downwardly to close the electrical circuit for providing the voltage from the voltage source through the voltage control V to the resistance wire or wires 10. As schematically illustrated, the switch contact 55 may be urged downwardly by a spring 57 or similar mechanism so that when the switch 55 is in the closed position, a resistance is provided by the spring 57 which delays the opening of the switch 55 so that the heating of the fluid within the pipe P may occur over a differential of five to ten degrees Fahrenheit, or some other selected range, before opening the switch 55. However, when the temperature within the pipe P has risen by the predetermined amount of the selected differential, the expansion of the fluid within the sensing bulb 52 will impart an expansion of such fluid within the bellows 50 to cause the switch 55 to move upwardly to the open position. The opening and closing of the switch S thus occurs automatically as necessary to maintain the desired temperature of the object being heated. It is to be noted that when the switch S is closed, the full constant voltage set by the control V passes through the wire or wires 10.

It will be understood that the switch S is merely illustrative of various kinds of switches which may be used is a position externally of the voltage control V. For example, a conventional bimetallic switch or a microswitch may be employed instead of the temperature expansive fluid type of switch illustrated in the drawings.

In the operation or use of the form of the invention illustrated in FIG. 1, the voltage control circuitry provides full-wave control of the power supply voltage with the variable resistor 40 affording means for manually adjusting the load power. Therefore, with a minimum of written instructions, an unskilled workman in the field may take a prefabricated voltage control V from the shelf together with a temperature responsive switch S and install them in conjunction with the heat transfer apparatus A, which also may be prefabricated as a shelf item, and by adjusting the resistor 40 in accordance with factors which can be readily determined such as the physical dimensions of the pipe P and the material to be heated, the installation may be readily accomplished. The temperature-responsive switch S may be preset at the shop or it may be set in the field to open and close at predetermined temperatures. For example, the switch S could be made adjustable by the inclusion of a spring adjusting bolt or screw 58 which is adapted to thread through a fixed plate 59 and engage the top of the spring 57 for increasing the compressive force exerted by the spring 57 on the switch contact 55. When the spring compression is thus increased, it will be appreciated that a greater bellows force is required to hold the switch 55 open and therefore the temperature at the bulb 52 would have to be increased to maintain the switch contact 55 in the open position. Of course, by reversing the adjusting screw 58 so as to move it upwardly, the spring compression of the spring 57 is reduced to permit the switch contact 55 to open at a lower temperature at the bulb 52. In any event, the operator in the field or at the shop can readily set the temperature-responsive switch S for predetermined temperature conditions with respect to the fluid or material within the pipe P to be heated. Therefore, by simply setting the switch S to the predetermined temperature range and by adjusting the resistor 40 to provide the desired voltage to the resistance heating wire or wires 10 for the known conditions, the installation may be accomplished in the field, regardless of the circumstances encountered, and using the components which have been prepared as shelf components in advance.

In FIG. 2, a modified apparatus is illustrated, wherein the heat transfer apparatus A and the temperature-responsive switch S are the same as in FIG. 1 and therefore have the same numeral and letter designations, but the variable voltage control V-1 of FIG. 2 differs from the voltage control V of FIG. 1 and therefore is described below. Thus, the voltage control V-1 of FIG. 2 includes a silicon controlled rectifier (SCR) identified by the numeral 60, which has a gate terminal 60a, a first rectifier terminal 60b and a second rectifier terminal 60c. Triggering of the SCR 60 is effected by a trigger circuit which includes two fixed resistors 62 and 64, a variable resistor 66, a capacitor 68 and a unijunction transistor 70. The transistor 70 has a base-one terminal 70a which is connected to the gate terminal 60a and also to a terminal 62a of the dropping resistor 62. The transistor 70 also has a base-two 70b which is connected to a terminal 64a of the second fixed resistor 64 and a terminal 66a of the variable resistor 66. The emitter terminal 70c of the transistor 70 is connected to the other terminal 66b of the variable resistor 66 and also to one of the capacitor terminals 68a. It is to be noted that the dropping resistor terminal 62b is connected to the capacitor terminal 68b and also is connected with the voltage source and the terminal 60b of the SCR 60. The other terminal 60c of the SCR 60 is connected to the opposite terminal 64b of the fixed resistor 64 and to the temperature-responsive switch S.

The variable resistor 66 may be set in the field in the same manner as previously described above in connection with the resistor 40 so that the proper heating conditions are provided with the electrical resistance heating wire or wires 10 for the particular physical dimensions and material being heated. The operation of the form of the invention illustrated in FIG. 2 is therefore essentially the same as that illustrated in FIG. 1. It is to be noted that in both forms of the invention illustrated in the drawings, the temperature-responsive switch S is externally disposed in the electrical circuit with respect to the voltage control. Likewise, the voltage control in each of the circuits is relatively simple and has a minimum of components for reliably controlling the voltage supplied to the heating wire or wires 10.

The foregoing disclosure and description of the invention is illustrative and explanatory thereof and various changes in the size, shape and materials, as well as in the details of the illustrated construction may be made within the scope of the appended claims without departing from the spirit of the invention.

What is claimed is:

1. Electrical resistance heating apparatus, comprising:
   (a) an electrical resistance heating wire adapted to be disposed on an object to be heated,
   (b) a voltage source,
   (c) an electric circuit connecting said voltage source to said heating wire and including a variable voltage control electrically connected in series with said voltage source and said heating wire,
(d) a temperature-responsive switch electrically connected in said electrical circuit in series with said heating wire, said voltage source, and said variable voltage control, and
(e) operating means for operating said temperature-responsive switch at selected temperatures,
(f) said operating means including a sensing mechanism adapted to be mounted on the object being heated by said electrical resistance heating wire for sensing the temperature of such object.

2. The apparatus set forth in claim 1, wherein said variable voltage control includes:
(a) a silicon controlled rectifier, and
(b) a variable resistor connected therewith for varying the voltage provided to said heating wire from the voltage control.

3. The apparatus set forth in claim 1, wherein said variable voltage control includes:
(a) a static, alternating current, semiconductor switch having a gate terminal and first and second switch terminals;
(b) a two terminal, bidirectional, trigger diode having first and second diode terminals wherein said first diode terminal is connected to the gate terminal of said semiconductor switch;
(c) a variable resistor having first and second resistor terminals wherein said first resistor terminal is connected to said second diode terminal and said second resistor terminal is connected to said first switch terminal;
(d) a charging capacitor having first and second capacitor terminals wherein said first capacitor terminal is connected to said second diode terminal and said second capacitor terminal is connected to said second switch terminal.

4. The apparatus set forth in claim 1, wherein said variable voltage control includes:
(a) a silicon controlled rectifier having first and second rectifier terminals and a gate terminal;
(b) a unijunction transistor having a base-one terminal, a base-two terminal and an emitter terminal, wherein said base-one terminal of said unijunction transistor is connected to said gate terminal of said silicon controlled rectifier;
(c) a first, fixed dropping resistor having first and second resistance terminals wherein said first resistance terminal is connected to said first rectifier terminal and said second resistance terminal is connected to said base-two terminal of said unijunction transistor;
(d) a second fixed resistance having first and second resistance terminals wherein said first resistance terminal of said second resistor is connected to said gate terminal of said silicon controlled rectifier and said second resistance terminal of said second resistor is connected to said second rectifier terminal of said silicon controlled rectifier;
(e) a capacitor having first and second capacitor terminals wherein said first capacitor terminal is connected to said second resistance terminal of said second fixed resistor and said second capacitor terminal is connected to said emitter of said unijunction transistor; and
(f) a variable resistor having first and second terminals wherein said first terminal of said variable resistor is connected to said base-two terminal of said unijunction transistor and said second terminal of said variable resistor is connected to said emitter of said unijunction.

5. The apparatus set forth in claim 1, wherein:
(a) said operating means includes a bellows having temperature expansive fluid therein, and
(b) said sensing means includes a bulb with a capillary tube connected thereto and to said bellows; said temperature expansive fluid being in said bulb and said capillary tube for expanding upon an increase in the temperature of the object being heated for thereby expanding said bellows to operate the temperature-responsive switch.

References Cited

UNITED STATES PATENTS

| | | | |
|---|---|---|---|
| 2,767,293 | 10/1956 | Jordan et al. | 219—494 |
| 2,816,202 | 12/1957 | Lennox | 219—494 |
| 3,254,838 | 6/1966 | Chambers | 219—581 |

BERNARD A. GILHEANY, Primary Examiner

F. E. BELL, Assistant Examiner